United States Patent
Samadani et al.

(10) Patent No.: US 8,724,090 B2
(45) Date of Patent: May 13, 2014

(54) POSITION ESTIMATION SYSTEM

(75) Inventors: Ramin Samadani, Palo Alto, CA (US); Ton Kalker, Mountain View, CA (US)

(73) Assignee: Hewlett-Packard Development Company, L.P., Houston, TX (US)

(\*) Notice: Subject to any disclaimer, the term of this patent is extended or adjusted under 35 U.S.C. 154(b) by 84 days.

(21) Appl. No.: 12/976,464

(22) Filed: Dec. 22, 2010

(65) Prior Publication Data

US 2012/0162630 A1    Jun. 28, 2012

(51) Int. Cl.
*G01C 3/08*    (2006.01)

(52) U.S. Cl.
USPC ......... 356/3.14; 356/3.01; 356/3.1; 356/4.01; 356/5.01

(58) Field of Classification Search
USPC ............ 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 4,811,004 A * | 3/1989 | Person et al. | 345/175 |
| 7,468,785 B2 * | 12/2008 | Lieberman | 356/3.14 |
| 7,519,223 B2 * | 4/2009 | Dehlin et al. | 382/203 |
| 7,534,988 B2 * | 5/2009 | Kong et al. | 250/221 |
| 7,999,923 B2 * | 8/2011 | Kaehler | 356/5.01 |
| 2003/0002033 A1 * | 1/2003 | Boman | 356/139.03 |
| 2004/0212617 A1 * | 10/2004 | Fitzmaurice et al. | 345/440 |
| 2005/0273201 A1 * | 12/2005 | Zukowski et al. | 700/258 |
| 2008/0100825 A1 * | 5/2008 | Zalewski | 356/29 |
| 2009/0110291 A1 * | 4/2009 | Matsumura et al. | 382/195 |

\* cited by examiner

*Primary Examiner* — Luke Ratcliffe

(57) ABSTRACT

A position estimation system comprising a plurality of 'shaped for depth sensing' lenses comprising a lens profile directly based on distance estimation propagation of errors; a plurality of light sensing devices associated with the plurality of 'shaped for depth sensing' lenses; and a position estimator for estimating a position of at least a first object with respect to a second object based on the plurality of 'shaped for depth sensing' lenses and the plurality of light sensing devices.

12 Claims, 3 Drawing Sheets

200

```
┌─────────────────────────────────────────────────────────────────────┐
│ DISPOSE A PLURALITY OF LIGHT SENSING DEVICES PROXIMATE TO A DISPLAY │
│                              SCREEN                                  │
│                               210                                    │
│  ┌───────────────────────────────────────────────────────────────┐  │
│  │  DISPOSE AT LEAST THREE CAMERAS PROXIMATE TO THE DISPLAY      │  │
│  │                          SCREEN                                │  │
│  │                           212                                  │  │
│  └───────────────────────────────────────────────────────────────┘  │
│  ┌───────────────────────────────────────────────────────────────┐  │
│  │   DISPOSE THE PLURALITY OF LIGHT SENSING DEVICES PROXIMATE    │  │
│  │              EACH CORNER OF THE DISPLAY SCREEN                │  │
│  │                           214                                  │  │
│  └───────────────────────────────────────────────────────────────┘  │
└─────────────────────────────────────────────────────────────────────┘
                                   │
                                   ▼
┌─────────────────────────────────────────────────────────────────────┐
│  DISPOSE A PLURALITY OF SHAPED FOR DEPTH SENSING LENSES PROXIMATE   │
│    THE PLURALITY OF LIGHT SENSING DEVICES, WHEREIN THE PLURALITY     │
│   OF SHAPED FOR DEPTH SENSING LENSES COMPRISE A LENS PROFILE BASED   │
│           ON DISTANCE ESTIMATION PROPAGATION OF ERRORS               │
│                               220                                    │
└─────────────────────────────────────────────────────────────────────┘
                                   │
                                   ▼
┌─────────────────────────────────────────────────────────────────────┐
│  ESTIMATE A POSITION OF AT LEAST OBJECT WITH RESPECT TO THE DISPLAY │
│    SCREEN BASED ON THE PLURALITY OF SHAPED FOR DEPTH SENSING LENSES │
│            AND THE PLURALITY OF LIGHT SENSING DEVICES                │
│                               230                                    │
│  ┌───────────────────────────────────────────────────────────────┐  │
│  │  TRIANGULATE THE POSITION OF THE OBJECT WITH RESPECT TO THE   │  │
│  │                     DISPLAY SCREEN                             │  │
│  │                          232                                   │  │
│  └───────────────────────────────────────────────────────────────┘  │
│  ┌───────────────────────────────────────────────────────────────┐  │
│  │  ESTIMATE A POSITION OF A FINGER TIP WITH RESPECT TO THE      │  │
│  │                    DISPLAY SCREEN                              │  │
│  │                          234                                   │  │
│  └───────────────────────────────────────────────────────────────┘  │
└─────────────────────────────────────────────────────────────────────┘
```

FIG. 2

POSITION ESTIMATION SYSTEM

BACKGROUND

Typically, depth sensing of an object is not very accurate and also has many drawbacks. For example, infrared cameras and IR sources attempt to estimate depth. However, these systems suffer from high power requirements and various other weaknesses, such as poor signal-to-noise ratios.

BRIEF DESCRIPTION OF THE DRAWINGS

FIG. 2 illustrates an embodiment of a method for position estimation.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1A:
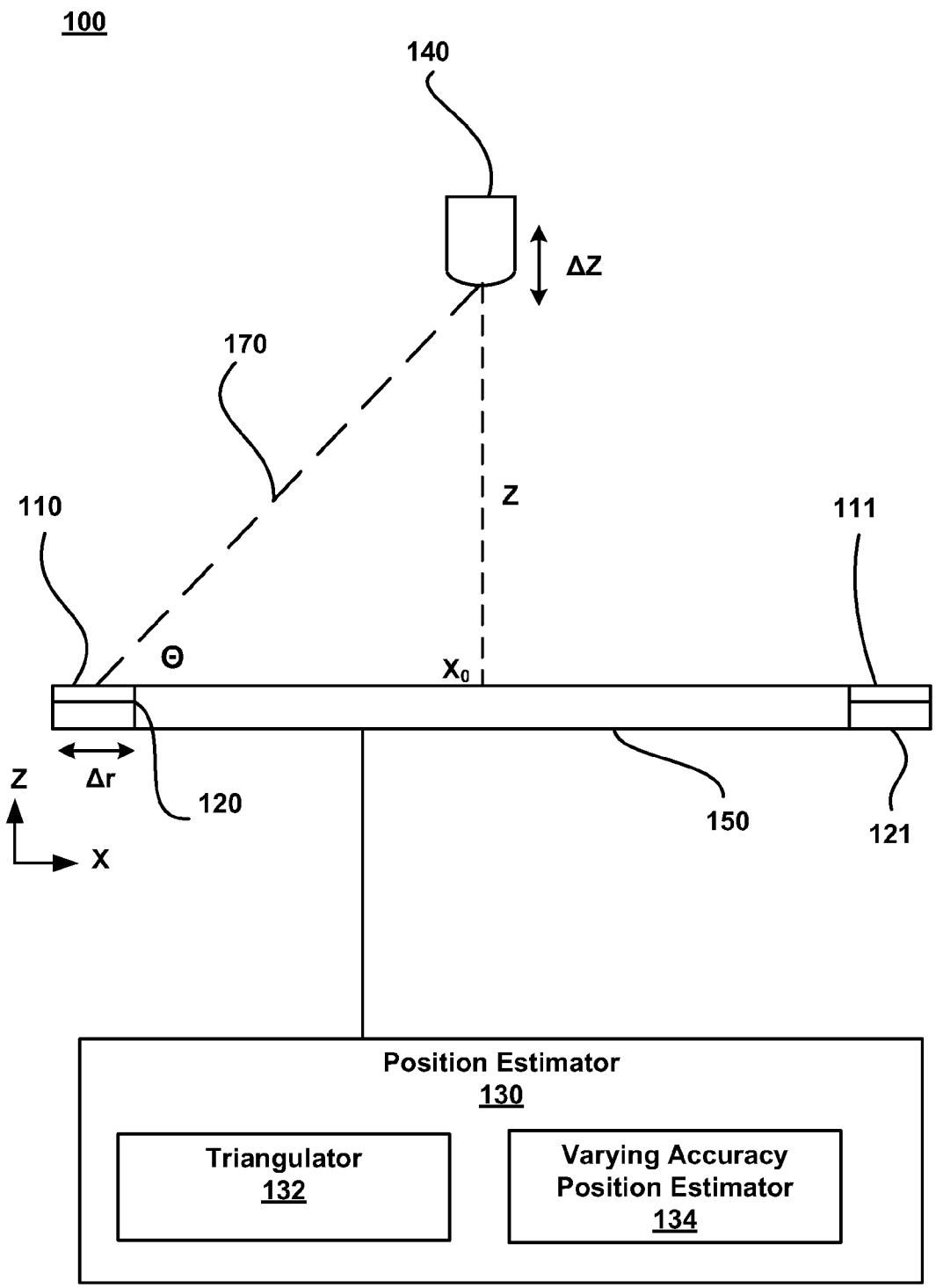
FIGS. 1A-B illustrate embodiments of a position estimation system.
Figure 1B:
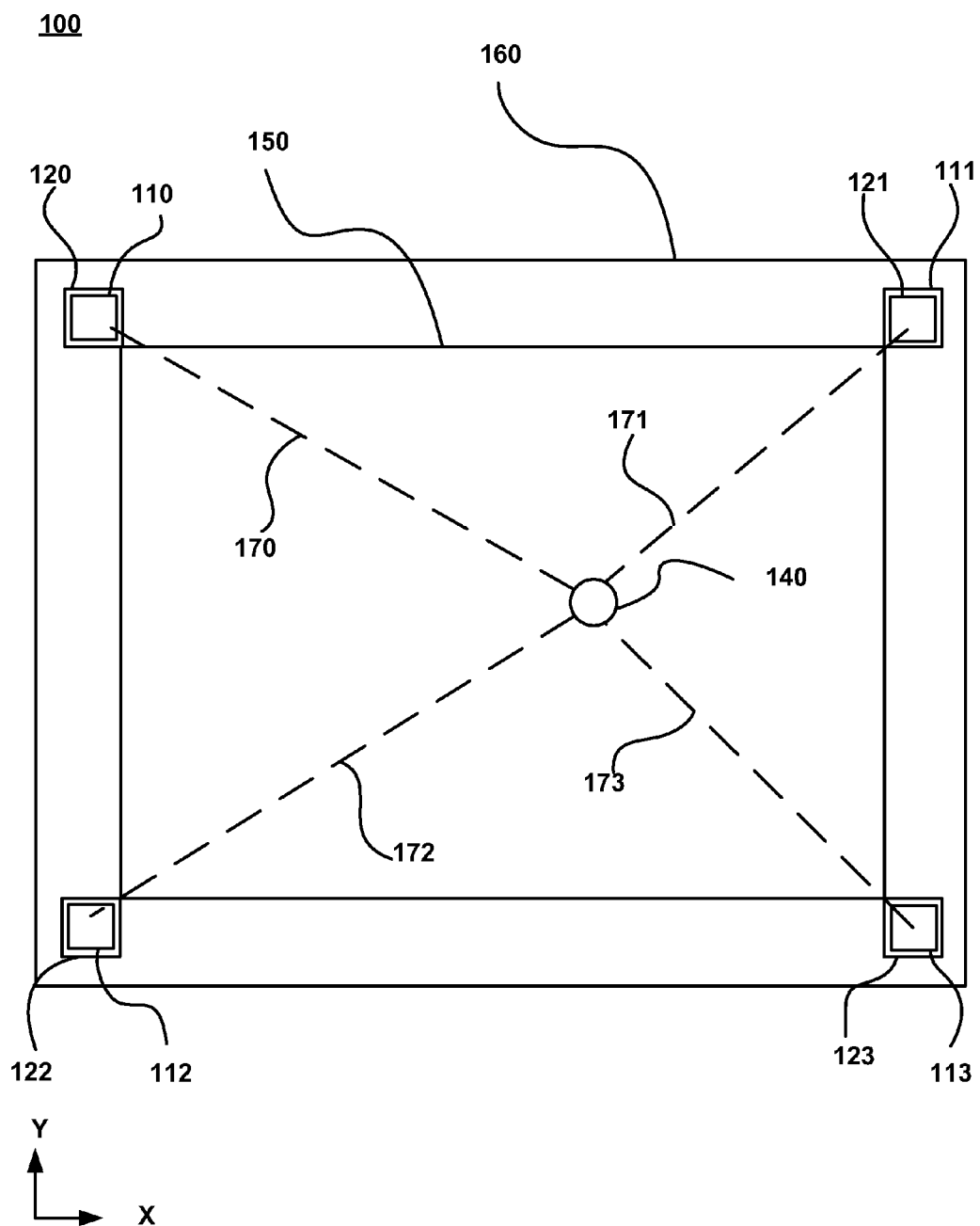

FIGS. 1A-B depict embodiments of position estimation system 100. Position estimation system 100 includes 'shaped for depth sensing' lenses 110-113, light sensing devices 120-123, and position estimator 130.

In general, position estimation system 100 is for determining a position of at least one object 140 (e.g., fingertip and stylus) with respect to display screen 150. For example, a user can manipulate objects displayed on display screen 150 based on the position of object 140 with respect to display screen 150. In contrast, conventional systems require a user to physically touch a display screen or use a pointing device, such as a mouse, that translates into motion of a cursor on the display screen.

It should be appreciated that position estimation system 100 can determine positions of multiple objects (e.g, multiple fingertips) with respect to display screen 150. However, for brevity and clarity, the description of position estimation system 100 will focus on the determination of the position of one object (e.g., object 140) with respect to display screen 150.

FIG. 1A depicts an embodiment of a side view of display screen 150, 'shaped for depth sensing' lenses 110-111 and light sensing devices 120-121. FIG. 1B depicts an embodiment of a front view of display screen 150, shaped for depth sensing lenses 110-113 and light sensing devices 120-123.

'Shaped for depth sensing' lenses 110-113 are designed and manufactured solely for sensing depth of at least one object (e.g., object 140) with respect to second object (e.g., display screen 150). In contrast, conventional lenses are designed for forming images rather than depth sensing.

'Shaped for depth sensing' lenses 110-113 include a lens profile directly based on distance estimation propagation of errors. In one embodiment, 'shaped for depth sensing' lenses 110-113 are convex. It should be appreciated that different sophistication may be used to generate the lens profiles. For example, a full error propagation formulation may be based on the particular depth estimation algorithm to be implemented. In one embodiment, the distance estimation propagation of errors is logarithmic. A description of the lens profile is provided in further detail below.

Light sensing devices 120-123 are for sensing light to facilitate in the determination of the position of object 140 with respect to display screen 150. Light sensing devices 120-123 are associated, respectively, with 'shaped for depth sensing' lenses 110-113. In various embodiments, a light sensing device is a charge-coupled device (CCD) or a complementary metal-oxide-semiconductor (CMOS). In one embodiment, light sensing devices 120-123 are off-the-shelf cameras that include a CCD or CMOS.

In one embodiment, position estimation system 100 includes light gratings (not shown) to facilitate in controlling the bending of light towards light sensing devices 120-123.

Position estimation system 100, as shown, includes four 'shaped for depth sensing' lenses and four associated light sensing devices. However, position estimation system 100 can include any number of 'shaped for depth sensing' lenses with associated light sensing devices (disposed at any position) that facilitates in estimating the position of object 140. In one embodiment, position estimation system 100 includes at least three 'shaped for depth sensing' lenses and at least three associated light sensing devices.

Display screen 150 is for displaying images to a user. Display screen 150 can be any display screen that displays images to a user. For example, display screen 150 (within housing 160) is a display screen associated with a cell phone, laptop, smart phone, etc.

With reference to FIGS. 1A-B, the discussion below will elaborate on the generation of a lens profile for depth estimation. It is noted that Z is the depth (or distance) from object 140 with respect to display screen 150. Moreover, ΔZ is the change in depth of object 140 with respect to display screen 150.

A propagation of error calculation assumes points on a line at a distance $X_0$ from shaped for depth sensing lens 110 and at a distance Z from display screen 150. As a result, a lens profile is given by:

$$r = f(\Theta), \quad \text{(equation 1)}$$

where r is the position on light sensing device 120 (e.g., position of a pixel on light sensing device 120) where optical ray 170 impinges shaped for depth sensing lens 110 at angle $\Theta$. Accordingly, detailed differential formulations of the error propagation, from a change in r (e.g., Δr) to a change in depth (and the inverse), can be generated to provide the ideal profile for lens 110 designed for depth estimation. As such, for the logarithmic error profile the relative error associated with ΔZ/Z translates into the same absolute displacement Δr on light sensing device 120, providing equal relative error response to the depth position estimates.

An embodiment of the generation of the lens profile is provided below. First, a distance $X_0$ is set from lens 110. Second, a distance Z is defined from the surface of display 150. Third, an error profile is specified. For example, a relative error profile is specified for a point at distance $X_0$ as a function of Z. Fourth, a lens profile is generated that matches the error profile error profile, described above.

Still referring to FIGS. 1A-B, position estimator 130 is for estimating a position of object 140 with respect to the surface of display screen 150. In one embodiment, position estimator 130 estimates a position of object 140 based on 'shaped for depth sensing' lenses 110-113 and light sensing devices 120-123. For example, position estimator 130 estimates the coordinates (e.g., x, y, z coordinates) of object 140 with respect to the surface of display screen 150. In another embodiment, position estimator 130 is able to simultaneously estimate positions of multiple objects with respect to the surface of display screen 150.

Position estimator 130 includes triangulator 132 and varying accuracy position estimator 134.

Triangulator 130 is for determining the position of object 140 via triangulation. In one embodiment, triangulator 130 requires information gathered from at least three light sensing devices and associated 'shaped for depth sensing' lenses.

In one embodiment, triangulator 130 determines coordinates of object 140 based on optical rays 170-173 impinging 'shaped for depth sensing' lenses 110-113 and interacting with light sensing devices 120-123, respectively.

FIG. 2 depicts an embodiment of a method 200 for position estimation. In various embodiments, method 200 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 200 is performed at least by position estimation system 100, as described in FIGS. 1A-B.

At 210 of method 200, a plurality of light sensing devices are disposed proximate to a display screen. For example, light sensing devices 120-123 are disposed at each corner of display screen 150.

In one embodiment, at 212, at least three cameras are disposed proximate to the display screen. For example, at least three cameras that include a CCD or CMOS are disposed proximate display screen 150.

In another embodiment, the plurality of light sensing devices are disposed proximate each corner of the display screen. For example, light sensing devices 120-123 are disposed at each corner of display screen 150.

At 220 of method 200, a plurality of 'shaped for depth sensing' lenses are disposed proximate the plurality of light sensing devices. The 'shaped for depth sensing' lenses comprise a lens profile based on distance estimation propagation of errors. For example, 'shaped for depth sensing' lenses 110-113 are disposed proximate light sensing devices 120-123. Also, 'shaped for depth sensing' lenses 110-112 include a lens profile (e.g., r=f(Θ)) based on logarithmic distance estimation propagation of errors.

At 230 of method 200, a position of an object with respect to the display screen is estimated based on the plurality of 'shaped for depth sensing' lenses and the plurality of light sensing devices. For example, X, Y, Z coordinates of a stylus with respect to display screen 150 is estimated.

In one embodiment, at 232, the position of the object is triangulated with respect to the display screen. For example, triangulator 132 triangulates the position of the tip of a user's finger with respect to a surface of display screen 150.

In another embodiment, at 234, a position of a finger tip with respect to the display screen is estimated. For example, a position of a user's finger tip with respect to the surface of display screen 150 is estimated.

Various embodiments are thus described. While particular embodiments are described, it should be appreciated that the present technology should not be construed as limited by such embodiments, but rather construed according to the following claims.

The invention claimed is:

1. A position estimation system comprising:
    a plurality of shaped for depth sensing lenses comprising a lens profile directly based on distance estimation propagation of errors;
    a plurality of light sensing devices associated with said plurality of shaped for depth sensing lenses, wherein the plurality of light sensing devices are co-located with a second object, wherein the second object is a display screen; and
    a position estimator for estimating a three-dimensional position of at least a first object with respect to said second object based on said plurality of shaped for depth sensing lenses and said plurality of light sensing devices.

2. The position estimation system of claim 1, wherein said position estimator comprises:
    a triangulator for triangulating said position of said first object with respect to said second object.

3. The position estimation system of claim 1, wherein said first object is selected from a group consisting of: a finger tip and a stylus.

4. The position estimation system of claim 1, wherein said second object is a display screen.

5. The position estimation system of claim 1, wherein said plurality of shaped for depth sensing lenses comprises:
    at least three shaped for depth sensing lenses.

6. The position estimation system of claim 1, wherein said plurality of light sensing devices are selected from a group consisting of: a CCD and a CMOS.

7. The position estimation system of claim 1, wherein said lens profile comprises:
    a position on a sensing device of said plurality of sensing devices where an optical ray impinges a depth sensing lens of said plurality of shaped for depth sensing lenses at an angle.

8. A method for position estimation, said method comprising:
    disposing a plurality of light sensing devices proximate to a display screen, wherein the plurality of light sensing devices are co-located with said display screen;
    disposing a plurality of shaped for depth sensing lenses proximate said plurality of light sensing devices, wherein said plurality of 'shaped for depth sensing' lenses comprise a lens profile based on distance estimation propagation of errors; and
    estimating a position of at least one object with respect to said display screen based on said plurality of shaped for depth sensing lenses and said plurality of light sensing devices.

9. The method of claim 8, wherein said disposing a plurality of light sensing devices proximate to a display screen comprises:
    disposing at least three cameras proximate to said display screen.

10. The method of claim 8, wherein said disposing a plurality of light sensing devices proximate to a display screen comprises:
    disposing said plurality of light sensing devices proximate each corner of said display screen.

11. The method of claim 8, wherein said estimating a position of an object with respect to said display screen comprises:
   triangulating said position of said object with respect to said display screen.

12. The method of claim 8, wherein said estimating a position of an object with respect to said display screen comprises:
   estimating a position of a fingertip with respect to said display screen.

\* \* \* \* \*